(12) United States Patent
Buehler et al.

(10) Patent No.: US 9,323,729 B2
(45) Date of Patent: *Apr. 26, 2016

(54) COORDINATING THE MANAGEMENT OF THE LAYOUT AND DESIGN OF PORTAL PAGES WITH THE MANAGEMENT OF ITS ASSOCIATED WEB CONTENT

(71) Applicant: International Business Machines Corporation, Armonk, NY (US)

(72) Inventors: Dieter Buehler, Boeblingen (DE); Hendrik Haddorp, Holzgerlingen (DE); Mark C. Hampton, Carlton (AU); Stefan A. Hepper, San Jose, CA (US); Carsten Leue, Sindelfingen (DE); Eric Martinez de Morentin, Manly (AU)

(73) Assignee: International Business Machines Corporation, Armonk, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/874,058

(22) Filed: Apr. 30, 2013

(65) Prior Publication Data

US 2013/0246908 A1    Sep. 19, 2013

Related U.S. Application Data

(63) Continuation of application No. 13/422,519, filed on Mar. 16, 2012.

(51) Int. Cl.
*G06F 17/21* (2006.01)
*G06F 17/22* (2006.01)
*G06F 17/30* (2006.01)

(52) U.S. Cl.
CPC ........ *G06F 17/2247* (2013.01); *G06F 17/3089* (2013.01)

(58) Field of Classification Search
CPC .................................................. G06F 17/00
USPC ......................................................... 715/234
See application file for complete search history.

(56) References Cited

U.S. PATENT DOCUMENTS 7,475,089 B1   1/2009   Geddes
7,543,005 B1   6/2009   Edelman et al.
(Continued)

OTHER PUBLICATIONS

Diaz et al., "Porlet Syndication: Raising Variablity Concerns", ACM, 2005, pp. 627-659.*

(Continued)

*Primary Examiner* — James J Debrow
(74) *Attorney, Agent, or Firm* — Robert A. Voigt, Jr.; Winstead, P.C.

(57) ABSTRACT

A method, system and computer program product for coordinating the management of portal pages and its associated web content. A node is created in the portal database representing a draft of a portal page, where the node refers to a data structure that holds structured information pertaining to the portal content (e.g., portlet instances, layout, design). A shadow node associated with the portal page is created in the web content management system, where the web content of the portal page is associated with the shadow node. The shadow node refers to a data structure that stores information used to identify the portal page stored in the portal database. The portal page, after completing various tasks in the workflow process, is rendered by linking the web content of the portal page associated with its shadow node with the portal content of the portal page stored in the portal database.

8 Claims, 8 Drawing Sheets

(56) References Cited

U.S. PATENT DOCUMENTS

| | | | |
|---|---|---|---|
| 7,818,676 B2 | 10/2010 | Baker et al. | |
| 7,984,417 B2 * | 7/2011 | Ben-Zvi et al. | 717/106 |
| 8,352,852 B2 * | 1/2013 | Heute | 715/229 |
| 2004/0254884 A1 * | 12/2004 | Haber et al. | 705/51 |
| 2006/0265355 A1 | 11/2006 | Taylor et al. | |
| 2006/0265655 A1 * | 11/2006 | Rosenberg | 715/704 |
| 2007/0067712 A1 * | 3/2007 | Baker et al. | 715/506 |
| 2007/0110231 A1 * | 5/2007 | Bales et al. | 380/30 |
| 2007/0124663 A1 * | 5/2007 | Fischer et al. | 715/501.1 |
| 2008/0040672 A1 * | 2/2008 | Appleyard et al. | 715/742 |
| 2008/0065762 A1 * | 3/2008 | Nauerz et al. | 709/224 |
| 2008/0066002 A1 * | 3/2008 | Nauerz et al. | 715/762 |
| 2010/0070847 A1 | 3/2010 | Hampton et al. | |
| 2010/0217777 A1 * | 8/2010 | Kussmaul | G06F 17/30876 707/776 |
| 2010/0251131 A1 * | 9/2010 | Jolley et al. | 715/742 |

OTHER PUBLICATIONS

Office Action for U.S. Appl. No. 13/422,519 dated Aug. 29, 2013.
Diaz et al., "Portlet Syndication: Raising Variability Concerns," ACM Transactions on Internet Technology, vol. 5, No. 4, Nov. 2005, pp. 627-659.
Office Action for U.S. Appl. No. 13/422,519 dated Aug. 8, 2014, pp. 1-22.
Office Action for U.S. Appl. No. 13/422,519 dated Feb. 21, 2014, pp. 1-20.
Office Action for U.S. Appl. No. 13/422,519 dated Mar. 24, 2015, pp. 1-12.

* cited by examiner

COORDINATING THE MANAGEMENT OF THE LAYOUT AND DESIGN OF PORTAL PAGES WITH THE MANAGEMENT OF ITS ASSOCIATED WEB CONTENT

CROSS-REFERENCE TO RELATED APPLICATIONS

The present application is a continuation application of pending U.S. patent application Ser. No. 13/422,519, which was filed on Mar. 16, 2012, which is assigned to the assignee of the present invention. The present application claims priority benefits to U.S. patent application Ser. No. 13/422,519.

TECHNICAL FIELD

The present invention relates to web portals, and more particularly to coordinating the management of the layout and design of portal pages with the management of its associated web content.

BACKGROUND

A web portal or links page is a website that functions as a point of access to information in the World Wide Web. A portal presents information from diverse sources in a unified way. Portals provide a way for enterprises to provide a consistent look and feel with access control and procedures for multiple applications and databases, which otherwise would have been different entities altogether. Typically, a portal page is displayed as a collection of non-overlapping portlet windows, where each portlet window displays a portlet. Portlets are pluggable user interface software components that are managed and displayed in a web portal. Portlets produce fragments of markup code that are aggregated into a portal. Hence, a portlet (or collection of portlets) resembles a web-based application that is hosted in a portal. Some examples of portlet applications are email, weather reports, discussion forums, and news.

A web content management system is a software system that provides website authoring, collaboration and administration tools designed to allow users with little knowledge of web programming languages or markup languages to create and manage website content with relative ease. In a web content management system, the design and layout of the web portals are separated from the content displayed within a website. This allows web content authors to create the content for your website without having to understand how to build a website. Some typical features of a web content management system include versioning which allows authorized editors to retrieve previous versions and to continue work from a selected point. Versioning is useful for content that changes over time and requires updating, but it may be necessary to go back to or reference a previous copy. Also, a web content management system may syndicate the web page to different subscribers.

However, by separating the designing of the portal page from the creating of the content of the portal page, there is not currently a means for coordinating the creating and updating of the design/layout of the portal page with its associated content in the web content management system that syndicates the portal page to different subscribers. For example, if the portal page is to be renamed, then you can change the name of the portal page that is defined in the portal database, but there is not currently a means for automatically renaming its associated content on the portal page. In another example, suppose that a portal page has been published with a typographical mistake. While one can revert to a prior version without the typographical mistake in the web content management system since the web content management system stores prior versions, such a change cannot automatically be made on the published portal page on the portal side.

BRIEF SUMMARY

In one embodiment of the present invention, a method for coordinating the management of portal pages and its associated web content comprises creating a node in a portal database representing a portal page. The method further comprises creating a shadow node to be associated with the portal page in a web content management system, where web content of the portal page is associated with the shadow node. In addition, the method comprises rendering, by a processor, the portal page with the web content of the portal page by linking the web content of the portal page associated with the shadow node with portal content of the portal page stored in the portal database.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for coordinating the management of portal pages and its associated web content. In one embodiment of the present invention, a node is created in the portal database representing a draft of a portal page, where the node refers to a data structure that holds structured information pertaining to the portal content, such as the portlet instances, wires between these portlet instances, information about the layout and design of the portal page, page title, description and metadata about the portal page. A shadow node associated with the portal page is created in the web content management system, where the web content of the portal page is associated with the shadow node. The shadow node refers to a data structure that stores information used to identify the portal page stored in the portal database. Each shadow node may be associated with child node(s) representing the web content used by the portal page that is associated with the shadow node. The portal page, after completing various tasks in the workflow process, is rendered by linking the web content of the portal page associated with its shadow node with the portal content (e.g., portlet instances, layout and design of the portal page) stored in the portal database. By including a shadow node hierarchy as discussed above, the portal content of the portal page is coordinated with its associated web content maintained in the web content management system.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
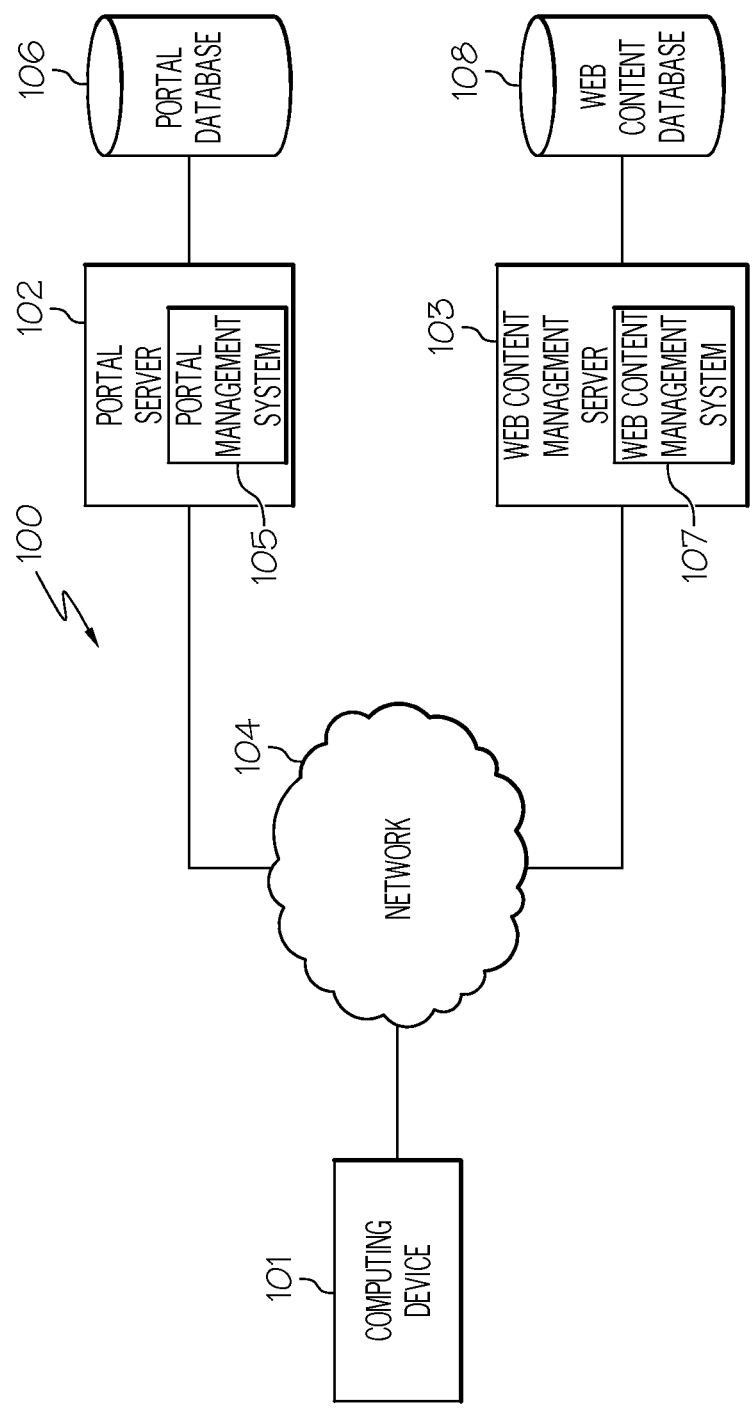
FIG. 1 illustrates a network system configured in accordance with an embodiment of the present invention.

Referring now to the Figures in detail, FIG. 1 illustrates a network system 100 for practicing the principles of the present invention in accordance with an embodiment of the present invention. Network system 100 includes a computing device 101 connected to a portal server 102 and a web content management server 103 via a network 104. Computing device 101 may be any type of computing device (e.g., portable computing unit, personal digital assistant (PDA), smartphone, laptop computer, mobile phone, navigation device, game console, desktop computer system, workstation, Internet appliance and the like) configured with the capability of connecting to network 104 and consequently communicating with portal server 102 and web content management server 103. A description of the hardware configuration of computing device 101 is provided below in connection with FIG. 2.

Network 104 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Portal server 102 includes a software component, referred to herein, as the "portal management system 105," configured to allow the user of computing device 101 to create or update the design and layout of a web portal page. These portal pages may be stored in a database 106 (referred to as the "portal database") coupled to portal server 102.

Web content management server 103 includes a software component, referred to herein, as the "web content management system 107, configured to allow the user of computing device 101 to manage the content of the portal page, such as creating or updating the content of the portal page, without changing the layout and design of the portal page. The content of the portal page may be stored in a database 108 (referred to as the "web content database") coupled to web content management server 103.

While FIG. 1 illustrates separate servers (e.g., portal server 102, web content management server 103) for managing the portal pages and web content, the software systems for managing the portal pages and web content may reside in a single server. In one embodiment, the software components for managing the portal pages and web content (e.g., software components 105, 107) may reside in the same computing device, including computing device 101 used by a user to create and update the layout/design of the portal page as well as its web content. The embodiments of network system 100 are not to be limited in scope to the depiction of FIG. 1.

Figure 2:
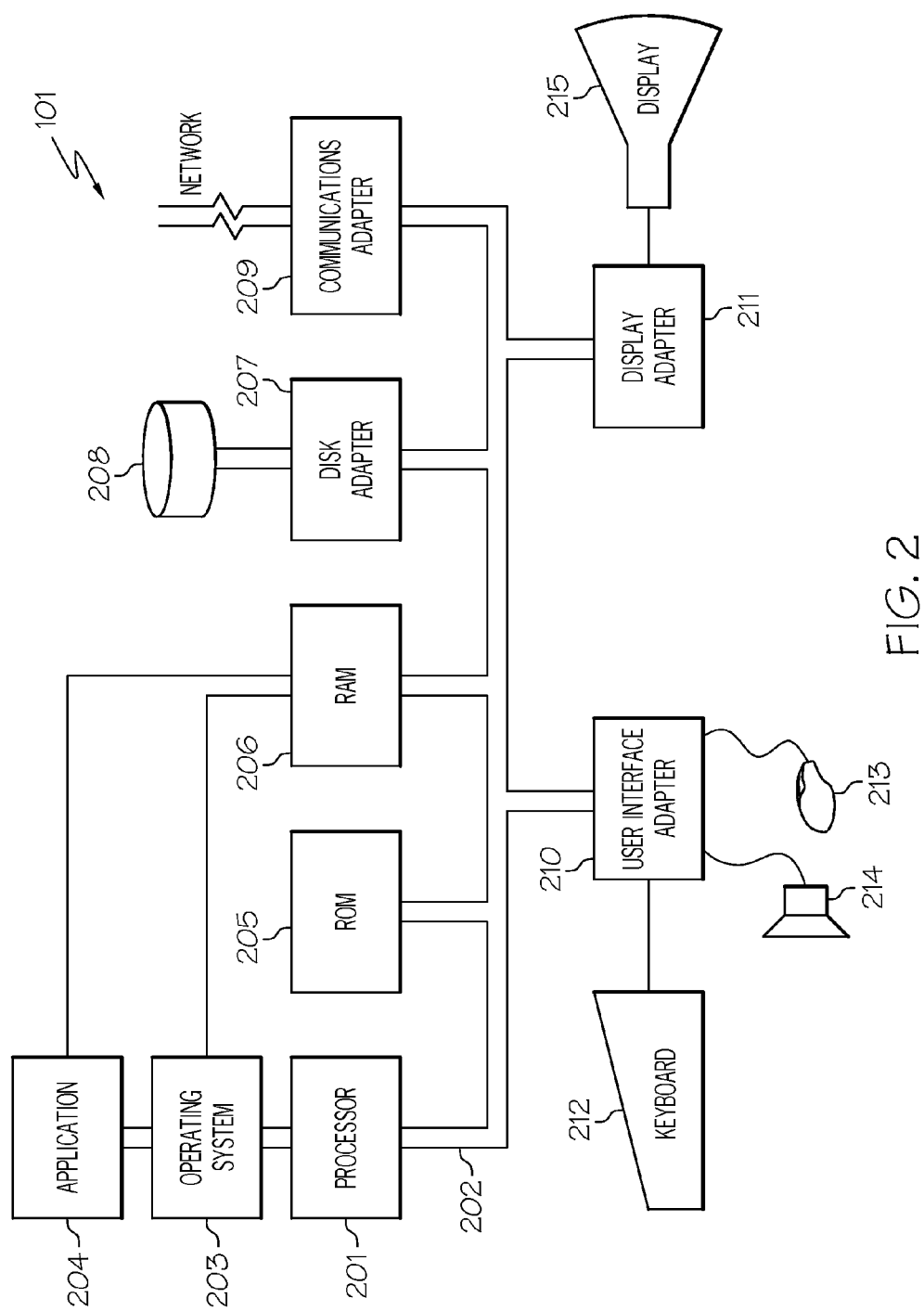
FIG. 2 illustrates a hardware configuration of a computing device in accordance with an embodiment of the present invention.

Referring now to FIG. 2, FIG. 2 illustrates a hardware configuration of computing device 101 (FIG. 1) which is representative of a hardware environment for practicing the present invention. Referring to FIG. 2, computing device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for coordinating the management of portal pages and its associated web content as discussed further below in association with FIGS. 3A-3B and 4-7d.

Referring again to FIG. 2, read-only memory ("ROM") 205 is coupled to system bus 202 and includes a basic input/output system ("BIOS") that controls certain basic functions of computing device 101. Random access memory ("RAM") 206 and disk adapter 207 are also coupled to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive. It is noted that the program for coordinating the management of portal pages and its associated web content as discussed further below in association with FIGS. 3A-3B and 4-7, as discussed further below in association with FIGS. 3A-3B and 4-6, may reside in disk unit 208 or in application 204.

Computing device 101 may further include a communications adapter 209 coupled to bus 202. Communications adapter 209 interconnects bus 202 with an outside network (network 104) thereby enabling computing device 101 to communicate with servers 102, 103.

I/O devices may also be connected to computing device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101 through keyboard 212 or mouse 213 and receiving output from computing device 101 via display 215 or speaker 214.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, a web content management system is a software system that provides website authoring, collaboration and administration tools designed to allow users with little knowledge of web programming languages or markup languages to create and manage website content with relative ease. In a web content management system, the design and layout of the web portals are separated from the content displayed within a website. This allows web content authors to create the content for your website without having to understand how to build a website. However, by separating the designing of the portal page from the creating of the content of the portal page, there is not currently a means for coordinating the creating and updating of the design/layout of the portal page with its associated content in the web content management system that syndicates the portal page to different subscribers.

Figure 3A:
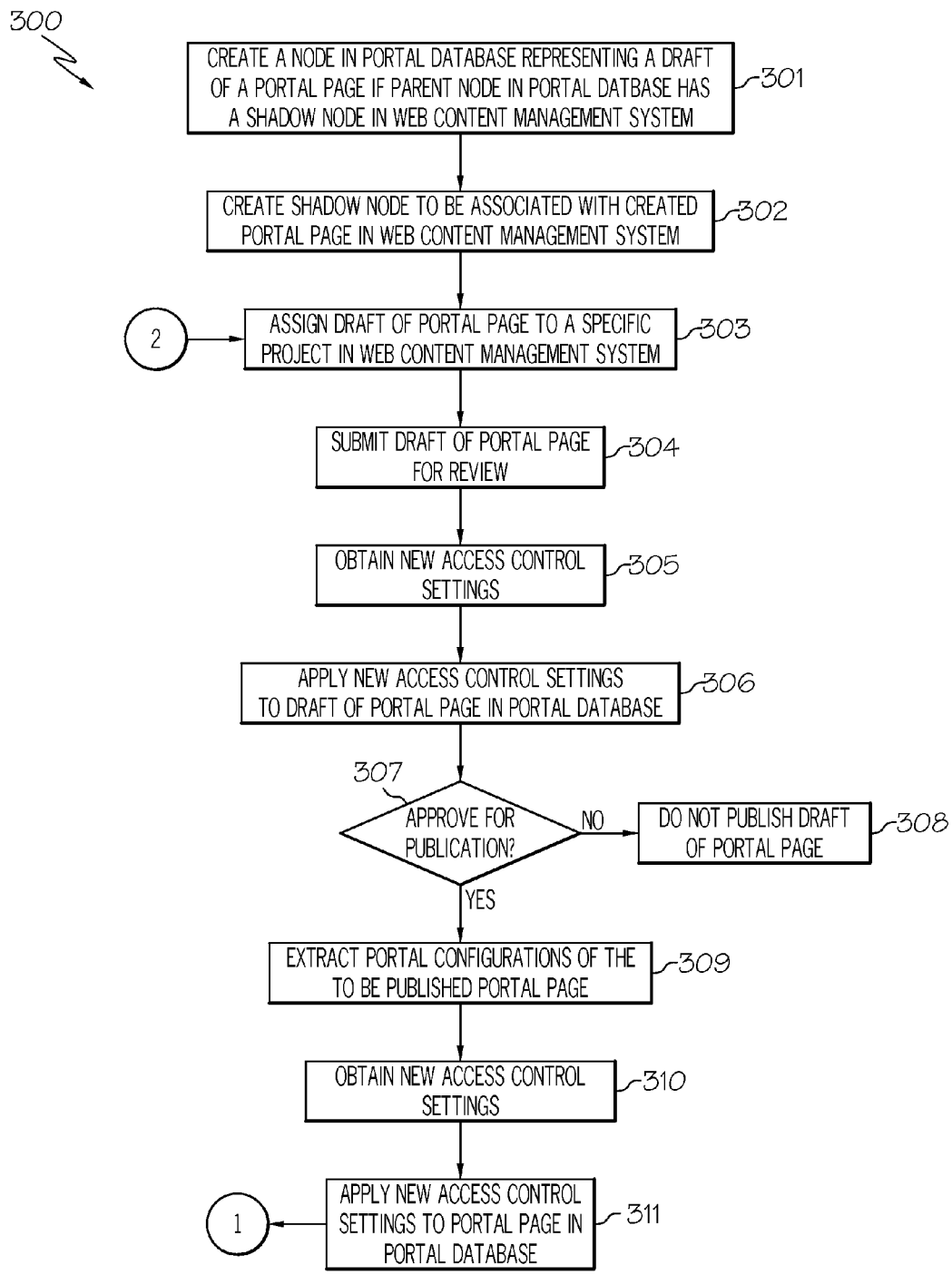
FIGS. 3A-3B are a flowchart of a method for coordinating the management of the portal pages with its associated web content in accordance with an embodiment of the present invention.
Figure 3B:
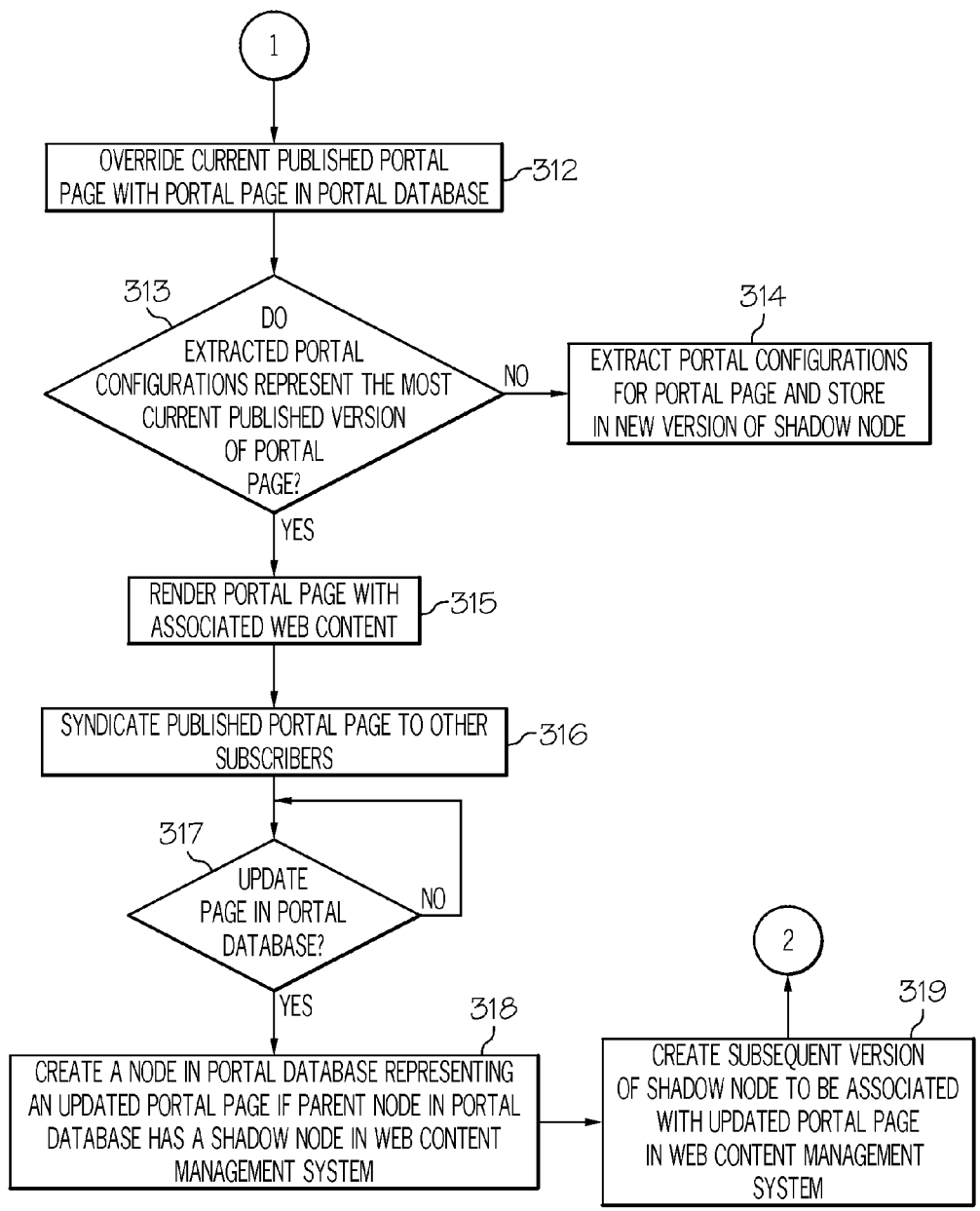
Figure 4:
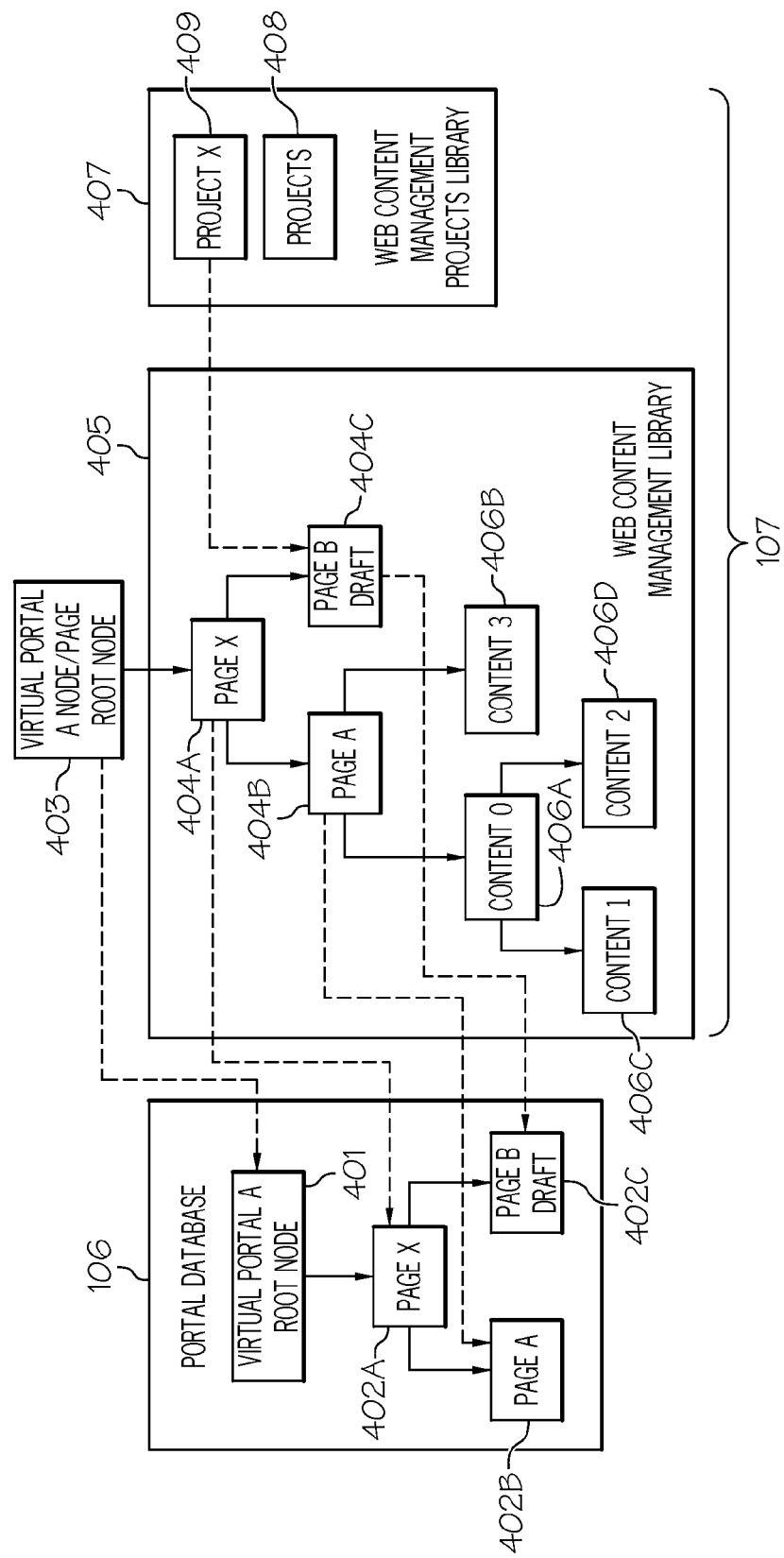
FIG. 4 illustrates the creation of a shadow node in a library of the web content management system in accordance with an embodiment of the present invention.
Figure 5:
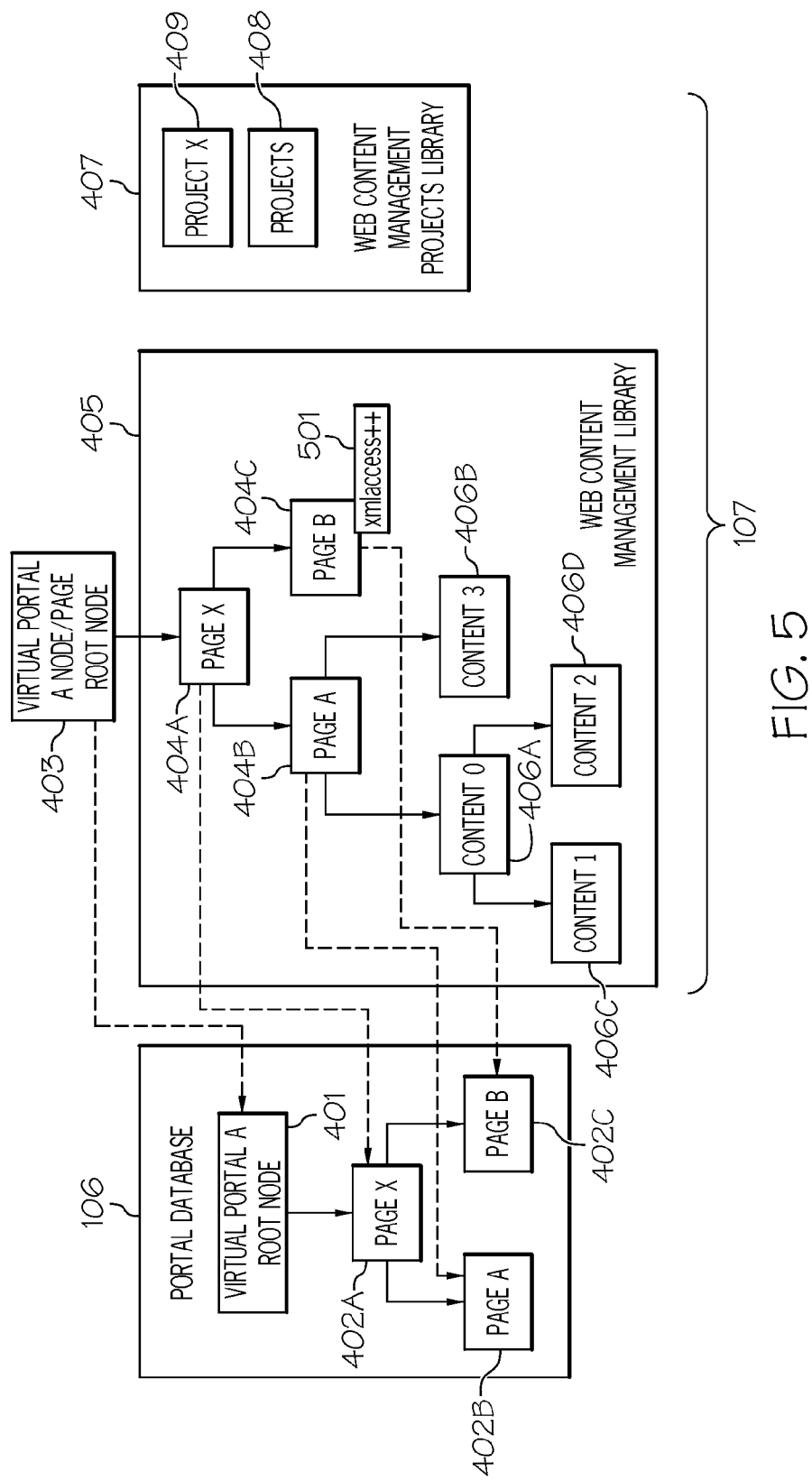
FIG. 5 illustrates extracting the portal configurations of the to-be-published portal page in accordance with an embodiment of the present invention.
Figure 6:
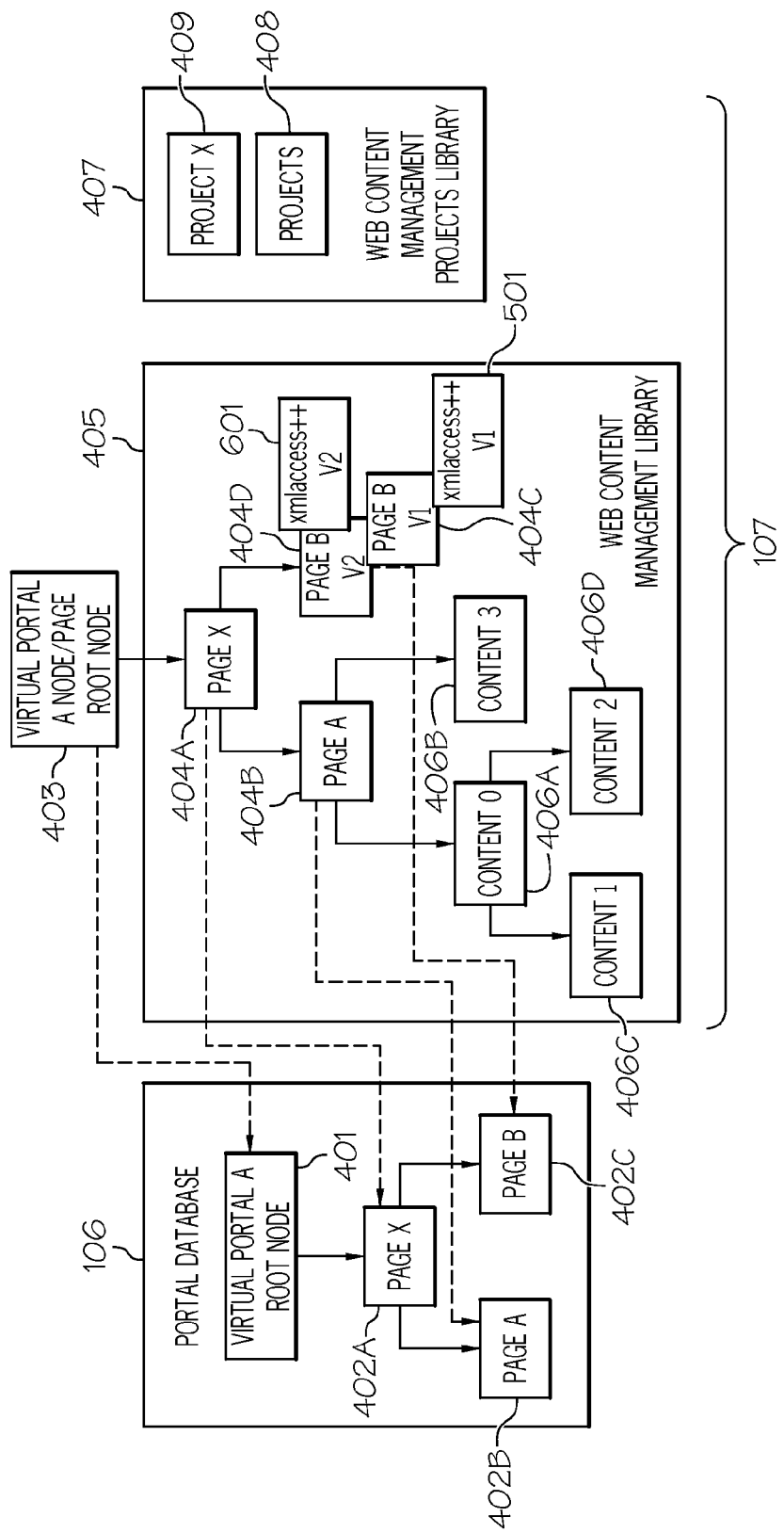
FIG. 6 illustrates storing a second set of extracted portal configurations for the to-be-published portal page in a new version of its associated shadow node in accordance with an embodiment of the present invention.
Figure 7:
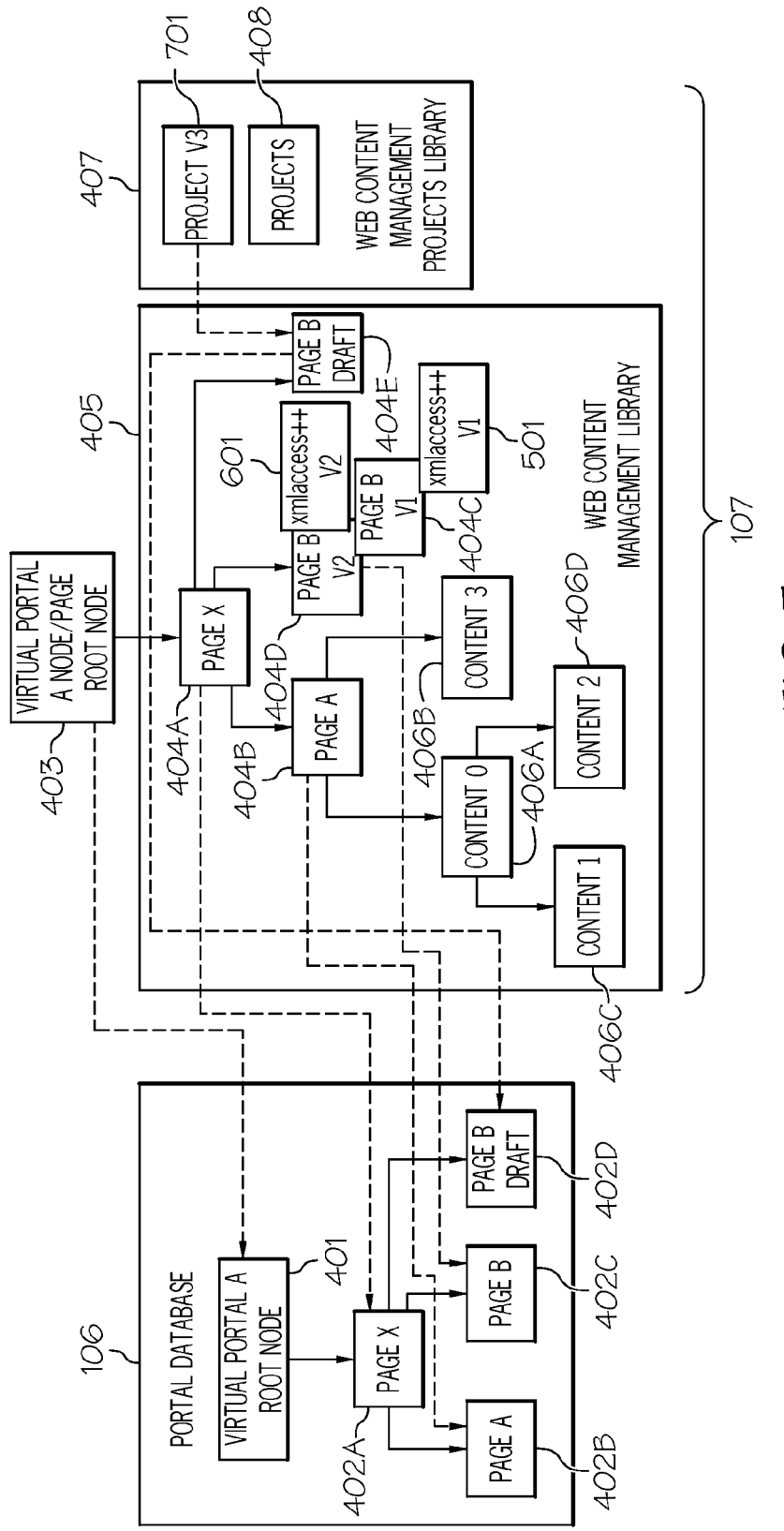
FIG. 7 illustrates updating the portal page in the portal database along with creating a subsequent version of the shadow node in the web content management system to represent the updated portal page in accordance with an embodiment of the present invention.

The principles of the present invention provide a means for coordinating the management of the portal pages and its associated web content as discussed further below in connection with FIGS. 3A-3B and 4-7. FIGS. 3A-3B are a flowchart of a method for coordinating the management of the portal pages with its associated web content. FIG. 4 illustrates the creation of a shadow node in a library of the web content management system. FIG. 5 illustrates extracting the portal configurations of the to-be-published portal page to be stored in the associated shadow node. FIG. 6 illustrates storing a second set of extracted portal configurations for the to-be published portal page in a new version of its associated shadow node. FIG. 7 illustrates updating the portal page in the portal database along with creating a subsequent version of the shadow node in the web content management system to represent the updated portal page.

As stated above, FIGS. 3A-3B are a flowchart of a method 300 for coordinating the management of the portal pages with its associated web content in accordance with an embodiment of the present invention.

Referring to FIG. 3A, in conjunction with FIGS. 1-2, in step 301, a node in portal database 106 is created that represents a draft of a portal page if its parent node in portal database 106 has a shadow node in web content management system 107. A "shadow node," as used herein, refers to a data structure that stores information used to identify the portal page stored in the portal database. Such information may include the name of the portal page (e.g., Uniform Resource Locator (URL) path segment name of the portal page), identifier of the portal page in portal database 106, Extensible Markup Language (XML) file of the portal page stored as a binary large object, a zip file of resources on the portal page in case the portal page consists of static HyperText Markup Language (HTML), etc. An illustration of such a shadow node in web content management system 107 as well as a draft of the portal page and its parent node in portal database 106 is provided in FIG. 4.

FIG. 4 illustrates the creation of a shadow node in a library of web content management system 107 in accordance with an embodiment of the present invention.

Referring to FIG. 4, portal database 106 includes a root node 401 (identified as "Virtual Portal A Root Node") which has child nodes 402A-402C, where child node 402C illustrates a draft of the created portal page (indicated by "Page B Draft"). The direct child node of root node 401 corresponds to child node 402A identified as "Page X." Child node 402A has two child nodes, 402B (identified by "Page A") and 402C (identified by "Page B Draft"). Child nodes 402A-402C may collectively or individually be referred to as child nodes 402 or child node 402, respectively. Root node 401 and child nodes 402 are data structures that hold structured information pertaining to the portal content, such as the portlet instances, wires between these portlet instances, information about the layout and design of the portal page, page title, description and metadata about the portal page.

Each node 401, 402 may have an associated "shadow node" in web content management system 107. For example, root node 401 has an associated shadow node 403 (identified as "Virtual Portal A Node/page root node") in web content management system 107. Child nodes 402A, 402B and 402C have associated shadow nodes 404A, 404B and 404C, respectively, that are stored in a library 405 (a collection of resources) of web content management system 107. As discussed above, shadow nodes refer to a data structure that stores information used to identify the associated portal page stored in portal database 106. Shadow nodes 404A-404C may collectively or individually be referred to as shadow nodes 404 or shadow node 404, respectively.

Each shadow node 404 may be associated with web content that is represented in a hierarchy format as shown in FIG. 4. That is, shadow nodes 404 may have child nodes representing its associated web content (i.e., web content used in the portal page represented by shadow node 404). For example, shadow node 404B has child nodes 406A (identified as "Content 0") and 406B (identified as "Content 3") representing its associated web content. Each child node may also have child nodes representing additional web content. For example, child node 406A has child nodes 406C (identified as "Content 1") and 406D (identified as "Content 2") representing additional web content to be used in connection with the web content represented by child node 406A.

As discussed above, a node representing a draft of a portal page is created in portal database 106 if its parent node in portal database 106 has a shadow node 404 in web content management system 107 in step 301. As illustrated in FIG. 4, node 402C, representing a draft of a portal page, is created in portal database 106 since its parent node, node 402A, has a shadow node 404A in web content management library 405.

Returning to FIG. 3A, in conjunction with FIGS. 1-2 and 4, in step 302, shadow node 404 is created in web content management system 107 that is to be associated with the created portal page (node 402 representing created portal page) in portal database 106. For example, referring to FIG. 4, shadow node 404C is created in web content management library 405 to be associated with the created portal page represented by node 402C in portal database 106.

In step 303, the draft of the portal page (e.g., node 402C representing the draft of the portal page) is assigned to a specific project in web content management system 107. For example, referring to FIG. 4, web content management system 107 includes a web content management projects library 407 that includes projects 408, including the project 409 (identified as "Project X") assigned to the draft of the created portal page (represented by shadow node 404C). By assigning the draft of the created portal page to a project, changes to the design/layout of the portal page as well as its associated content may be grouped together and may be approved, published and syndicated together.

In step 304, the draft of the created portal page is submitted for review. In one embodiment, as part of the workflow process (cycle of sequential and parallel tasks that are accomplished in the web content management system), one or many content creators can submit a portal page but is not published until an editor reviews and approves it for publishing.

In step 305, new access control settings based on the workflow process are obtained in response to the draft of the portal page being submitted for review. Access control settings refer to controlling how registered users interact with the portal page. A page on a website may be restricted to one or more groups. Hence, if an anonymous user or a logged on user who is not a member of the group a page is restricted to, then the user will be denied access to the page.

In step 306, the new access control settings are applied to the draft of the portal page (represented by node 402) in portal database 106.

In step 307, a determination is made as to whether the draft of the portal page has been approved for publication. If the draft of the portal page has not been approved for publication, then, in step 308, the draft of the portal page is not published.

If, however, the draft of the portal page has been approved for publication, then, in step 309, the portal configurations of the to-be published portal page is extracted and stored in the associated shadow node 404. These portal configurations may be extracted using a utility called "XML Access" as illustrated in FIG. 5.

FIG. 5 illustrates extracting the portal configurations of the to-be-published portal page and stored in its associated shadow node 404 in accordance with an embodiment of the present invention. Referring to FIG. 5, such portal configurations may be represented as "xmlaccess++" 501. As illustrated in FIG. 5, the portal configurations of the portal page to-be published (represented by node 402C in portal database 106) are extracted and stored in the portal page's associated shadow node 404 (e.g., shadow node 404C). As further illustrated in FIG. 5, the "draft" status of the portal page for node 402C is no longer indicated as the portal page has been approved.

Returning to FIG. 3A, in conjunction with FIGS. 1-2 and 4-5, in step 310, a second set of new access control settings based on the workflow process are obtained. A new set of access control settings may be obtained since the access control list may change per state (e.g., draft stage, review stage) in the workflow process.

In step 311, the second set of new access control settings are applied to the portal page approved for publication (represented by node 402) in portal database 106.

Referring to FIG. 3B, in conjunction with FIGS. 1-2 and 4-5, in step 312, the current published portal page is overridden with the portal page to be published.

In step 313, a determination is made as to whether the extracted portal configurations (extracted in step 309 of FIG.

3A) represent the most current published version of the portal page. In one embodiment, such a determination may be made in connection with a time stamp associated with the extracted portal configurations (e.g., time stamp indicating when the portal configurations were extracted) and a time stamp associated with the portal page (e.g., time stamp indicating the time of the latest update/modification). By comparing these time stamps, a determination can be made as to whether the extracted portal configurations (extracted in step 309 of FIG. 3A) represent the most current published version of the portal page. In another embodiment, such a determination may be made in connection with using a version associated with the extracted portal configurations and a version associated with the portal page. If the versions differ, then the extracted portal configurations (extracted in step 309 of FIG. 3A) do not represent the most current published version of the portal page. However, if the versions are the same, then the extracted portal configurations (extracted in step 309 of FIG. 3A) represent the most current published version of the portal page.

If the extracted portal configurations (extracted in step 309 of FIG. 3A) do not represent the most current published version of the portal page, then, in step 314, a second set of portal configurations are extracted for the to-be published portal page and stored in a new version of the associated shadow node 404 as illustrated in FIG. 6.

FIG. 6 illustrates storing a second set of extracted portal configurations for the to-be published portal page in a new version of its associated shadow node in accordance with an embodiment of the present invention.

Referring to FIG. 6, a second set of portal configurations (represented by "xmlaccess++V2" 601) are extracted for the to-be published portal page (represented by node 402C) and stored in a new version of its associated shadow node 404D (identified as "Page B V2"). As illustrated in FIG. 6, the older versions of the shadow node 404 (e.g., shadow node 404C), along with the extracted portal configurations for the associated portal page (e.g., "xmlaccess++v1" 501) are still maintained. Hence, the feature of versioning can occur in the web content management system 107, where versioning allows authorized editors to retrieve previous versions and to continue work from a selected point. Versioning is useful for content that changes over time and requires updating, but it may be necessary to go back to or reference a previous copy.

Returning to FIG. 3B, in conjunction with FIGS. 1-2 and 4-6, if the extracted portal configurations (those extracted in step 309 of FIG. 3A) represent the most current published version of the portal page, or upon extracting a second set of portal configurations for the portal page to-be published, then, in step 315, the portal page is rendered along with its associated web content. In one embodiment, the portal page is rendered with its associated web content (i.e., the content of the portal page) by linking the web content of the portal page (associated with its shadow node 404) with the portal content (e.g., portlet instances, wires between these portlet instances, information about the layout and design, page title, description and metadata) of the portal page stored in portal database 106. For example, referring to FIG. 5, if the portal page identified by node 402B ("Page A") in portal database 106 is to be rendered, then its web content, represented by nodes 406A-406D, associated with its shadow node 404 (e.g., shadow node 404B) is linked with the portal content (e.g., portlet instances, layout, design) of the portal page stored in portal database 106. By including such a shadow node hierarchy, the portal content of the portal page (e.g., portlet instances, layout, design) is coordinated with its associated web content maintained in the web content management system via the linking process described above. In one embodiment, a web content viewer portlet may be used to render the portal page along with its associated web content of web content management system 107 by implementing the linking process described above.

In step 316, web content management system 107 syndicates the published portal page to other subscribers, such as by updating the portal pages in the subscriber machines with the published portal page. In one embodiment, the extracted portal configurations (such as those represented as "xmlaccess++" 501 of FIG. 5) may be used by the subscriber to recreate the new or updated portal page (updating portal page is discussed further below).

In step 317, a determination is made as to whether a portal page is updated in portal database 106. If a portal page has not been updated, then computing device 101 continues to determine whether a portal page has been updated in portal database 106.

If, however, a portal page is updated in portal database 106, then, in step 318, a node in portal database 106 is created, where the node represents an updated portal page, including updates, if its parent node in portal database 106 has a shadow node 404 in web content management system 107 as illustrated in FIG. 7.

FIG. 7 illustrates updating the portal page in the portal database along with creating a subsequent version of shadow node 404 in web content management system 107 to represent the updated portal page in accordance with an embodiment of the present invention.

Referring to FIG. 7, a node 402D is created representing the updated portal page (identified as "Page B Draft") since its parent node, node 402A, has a shadow node, node 404A, in web content management system library 405.

Referring to FIG. 3B, in conjunction with FIGS. 1-2 and 4-7, in step 319, a subsequent version of shadow node 404 is created in web content management system 107 that is to be associated with the updated portal page (e.g., node 402D representing the updated portal page) in portal database 106. For example, referring to FIG. 7, shadow node 404E (identified as "Page B Draft") (will become version 3 after approval and publication of its associated portal page) is created in web content management library 405 to be associated with the created portal page represented by node 402D in portal database 106.

After creating the subsequent version of shadow node 404 in web content management system 107, a draft of the updated portal page is assigned to a specific project in web content management system in step 303. As illustrated in FIG. 7, the updated portal page, represented by node 402D in portal database 106 that is associated with shadow node 404E, is associated with a project 701 referred to as "Project V3" stored in web content management projects library 407.

In some implementations, method 300 may include other and/or additional steps that, for clarity, are not depicted. Further, in some implementations, method 300 may be executed in a different order presented and that the order presented in the discussion of FIGS. 3A-3B is illustrative. Additionally, in some implementations, certain steps in method 300 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for coordinating the management of portal pages and its associated web content, the method comprising:
creating a first node in a portal database representing a portal page;
creating a first shadow node to be associated with said portal page in a web content management system, wherein web content of said portal page is associated with said first shadow node; and
rendering, by a processor, said portal page with said web content of said portal page by linking said web content of said portal page associated with said first shadow node with portal content of said portal page stored in said portal database.

2. The method as recited in claim 1, wherein said first node representing said portal page is created in said portal database in response to its parent node in said portal database having a second shadow node in said web content management system.

3. The method as recited in claim 1 further comprising:
assigning said portal page to a project in said web content management system.

4. The method as recited in claim 1 further comprising:
obtaining a first set of access control settings in response to said portal page being submitted for review; and
applying said first set of access control settings to said portal page in said portal database.

5. The method as recited in claim 4 further comprising:
extracting a first set of portal configurations of said portal page in response to being approved for publication.

6. The method as recited in claim 5 further comprising:
obtaining a second set of access control settings; and
applying said second set of access control settings to said portal page in said portal database; and
overriding a current published portal page with said portal page.

7. The method as recited in claim 6 further comprising:
extracting a second set of portal configurations of said portal page in response to said first set of extracted portal configurations not representing a most current published version of said portal page.

8. The method as recited in claim 1 further comprising:
creating a second node in said portal database representing a second version of said portal page containing updates of said portal page in response to updating said portal page in said portal database; and
creating a second version of said first shadow node to be associated with said second version of said portal page in said web content management system.

* * * * *